United States Patent [19]

Dunn et al.

[11] Patent Number: 4,606,569

[45] Date of Patent: Aug. 19, 1986

[54] TONGS FOR GRASPING FOOD

[75] Inventors: James R. Dunn, Fairfield, Conn.; Lee R. Chasen, Port Chester, N.Y.

[73] Assignee: Coats & Clark, Inc., New Rochelle, N.Y.

[21] Appl. No.: 703,910

[22] Filed: Feb. 21, 1985

[51] Int. Cl.[4] .......................... B25B 7/02; A01B 1/18

[52] U.S. Cl. .......................................... 294/118; 294/16

[58] Field of Search ........................ 294/118, 8, 8.5, 7, 294/11, 16, 25, 28, 29, 31.1, 49, 50.6, 50.8, 50.9, 55, 55.5, 104, 106; 56/400.12, 400.17, 400.18, 400.21

[56] References Cited

U.S. PATENT DOCUMENTS 1,742,232 1/1930 Casale ................................ 294/118
3,964,775 6/1976 Boyd .................................. 294/118

*Primary Examiner*—James B. Marbert
*Attorney, Agent, or Firm*—Burgess, Ryan & Wayne

[57] ABSTRACT

A pair of tongs for grasping food which is otherwise difficult to pick up, such as spaghetti, other pasta products, broccoli, beans, and eggs. The tongs have a ladle bowl at the end of one stem and a spoon at the end of the other stem. The ladle bowl and spoon have perforated major surfaces for draining purposes. The ladle bowl has an imperforate lower side wall and an upper side wall in the form of a number of spaced-apart fingers which extend upward from the lower side wall. When the tongs are closed, the spoon enters into the ladle bowl below the level of the fingers, to securely retain the food between the lower portion of the ladle bowl and the spoon.

5 Claims, 9 Drawing Figures

TONGS FOR GRASPING FOOD

BACKGROUND OF THE INVENTION

This invention relates to a pair of tongs for grasping food and is particularly suitable for, but not limited to, the grasping of pasta products and vegetables having irregular shapes.

Spoon-type tools for picking up spaghetti and other pasta products are on the market. One of those tools is manufactured by Hoan Products Ltd. and is a spoon having a side wall, the upper part of which is made up of a number of spaced-apart fingers extending from the lower portion of the side wall.

Also known in the art is a pair of serving spoons which are resiliently coupled together, as shown in U.S. Pat. No. 1,643,456 to James.

These prior art products, however, have proven to be of limited effectiveness in picking up spaghetti and other irregular-shaped food products.

Accordingly, an object of the present invention is to provide an improved pair of tongs for grasping food.

SUMMARY OF THE INVENTION

As herein described, there is provided a pair of tongs for grasping food comprising a first tong member having: a first stem, a first handle at one end of the first stem, and a ladle bowl having a perforated bottom, a lower side wall, and an upper side wall structure comprising a plurality of spaced-apart fingers extending from said lower side wall; and a second tong member having a second stem pivotally mounted to said first stem, a second handle at one end of the second stem adjacent said first handle, and a spoon at the other end of the second stem, said spoon having a perforated major surface and being adapted to enter into said ladle bowl.

IN THE DRAWING

DETAILED DESCRIPTION

Figure 1:
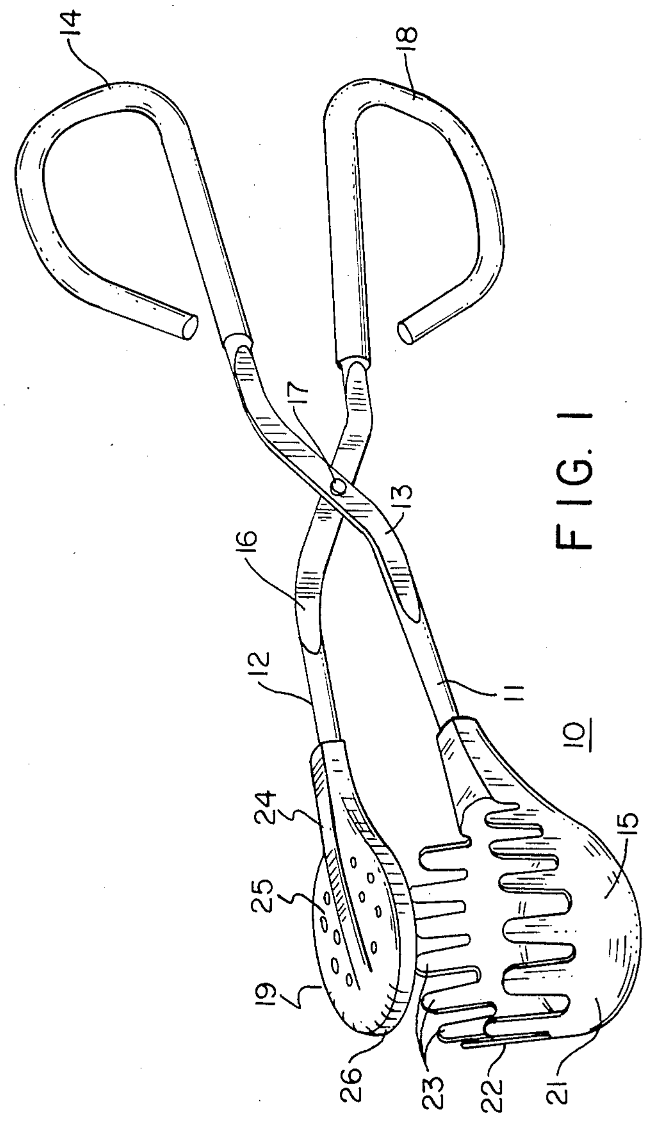
FIG. 1 is a perspective view showing a pair of tongs according to a preferred embodiment of the invention, in partially open position.
Figure 7:
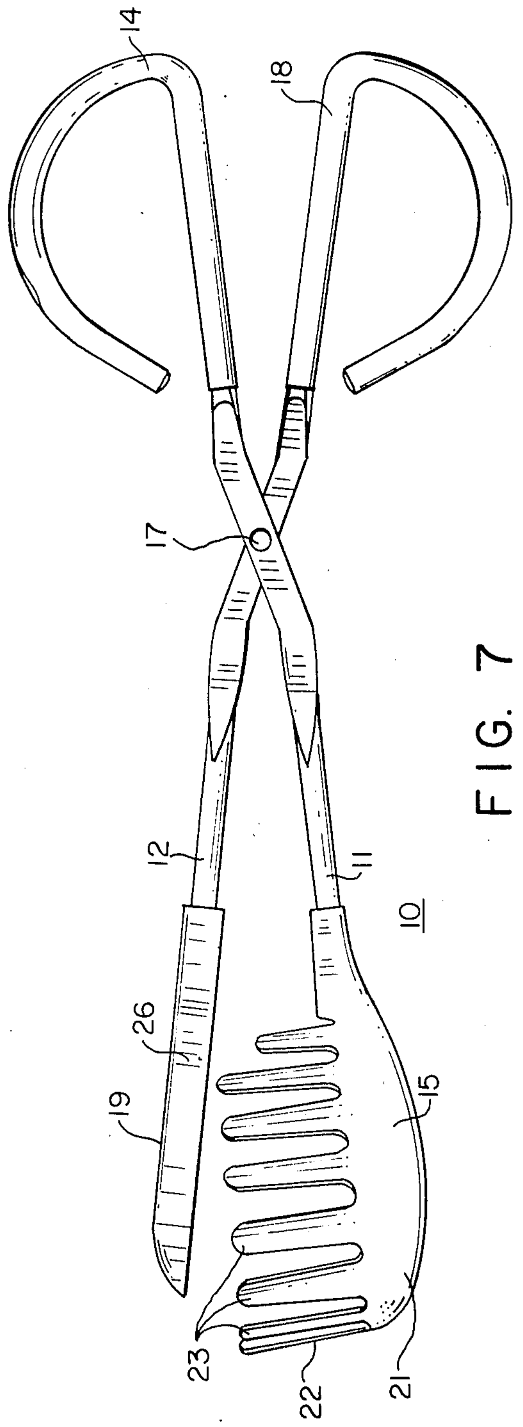
FIG. 7 is a front elevation view thereof, the rear elevation view being a mirror image.

A pair of tongs 10 shown in the drawing figures comprises a first tong member 11 and a second tong member 12. The tong member 11 has a stem 13, a handle 14 at one end of the stem, and a ladle bowl 15 at the other end of the stem. Similarly, the tong member 12 has a stem 16 pivotally mounted to the stem 13 by the pivot pin 17, a handle 18 at one end of the stem 16, and a spoon 19 at the other end of the stem 16.

Figure 4:
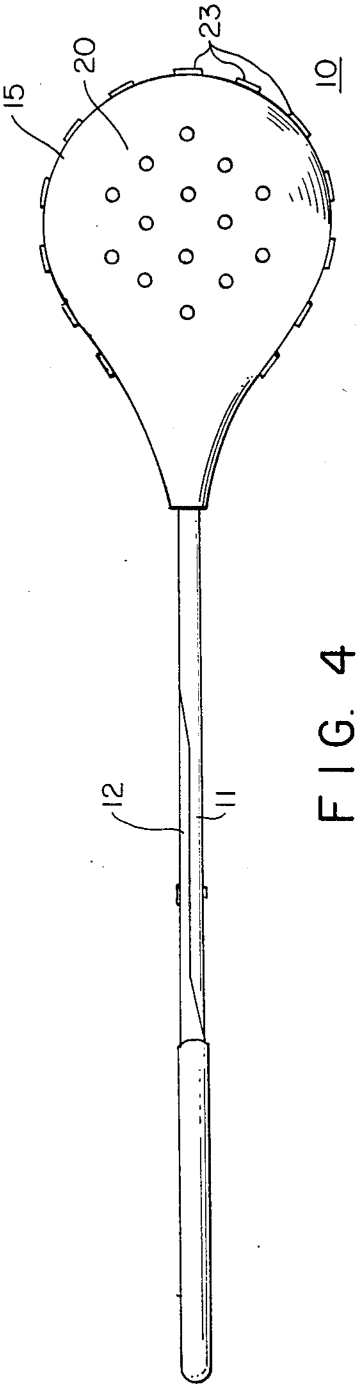
FIG. 4 is a bottom plan view thereof.
Figure 8:
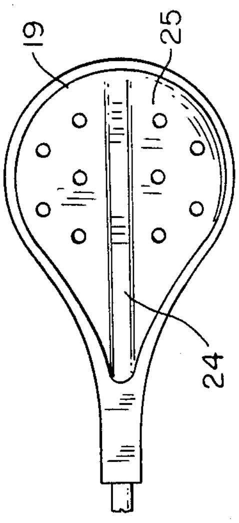
FIG. 8 is a bottom plan view of the upper member of the tongs.

The ladle bowl 15 has a perforated bottom 20, as best seen in FIG. 4, an imperforate lower side wall 21, and an upper side wall structure 22 comprising a plurality of spaced-apart generally parallel fingers 23 extending from the lower side wall 21.

The spoon 19 has a central reinforcing rib 24 formed integrally therewith, and a perforated upper major surface 25.

Figure 2:
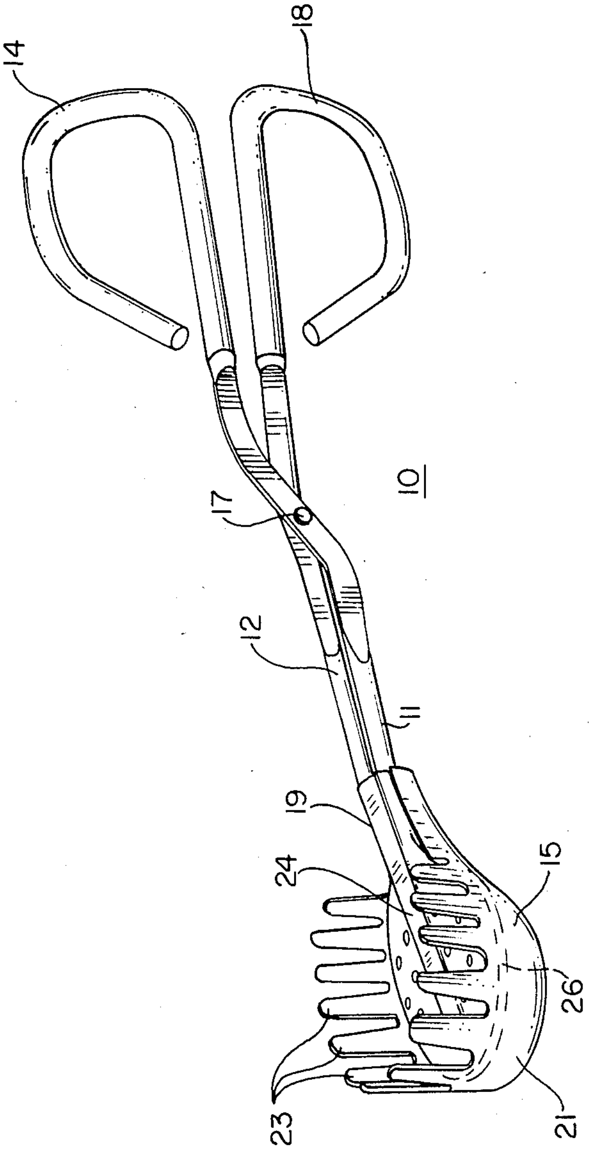
FIG. 2 is a perspective view showing the tongs in closed position.
Figure 3:
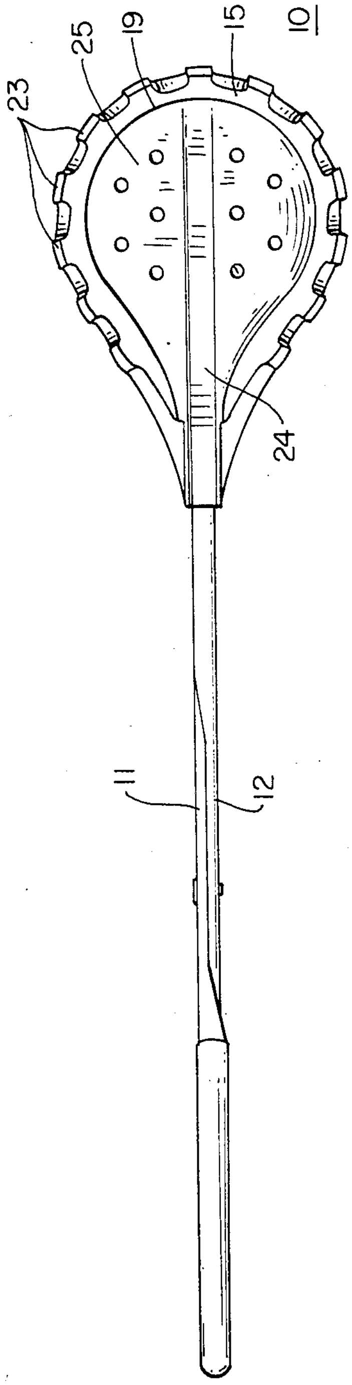
FIG. 3 is a top plan view showing the tongs in a partially open position.

The spoon 19 is dimensioned to enter into and substantially cover the ladle bowl 15 below the level of the upper side wall structure 22 thereof, i.e., to provide a closed position as best shown in FIG. 2. However, as best shown in FIG. 3, a peripheral clearance gap is provided between the outside of the spoon and the inside of the ladle bowl to allow food such as spaghetti to extend through the clearance gap without being sheared between the spoon and ladle bowl.

In this closed position, spaghetti and other pasta products are retained between the imperforate portion 21 of the ladle bowl 15 and the major surface 25 of the spoon 19, while the perforations in the bottom of the ladle bowl and the top of the spoon permit draining of water and other relatively thin fluids, and the spaghetti strands extend outward through the slots defined by the spaces between the fingers 23.

Figure 9:
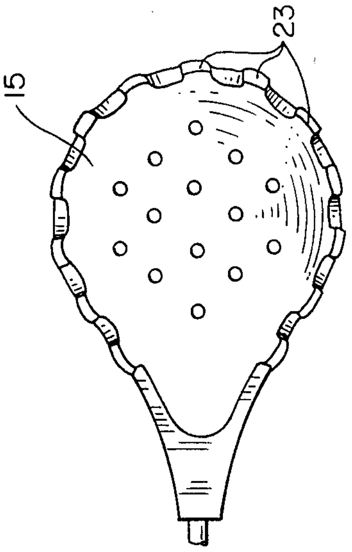
FIG. 9 is a top plan view of the lower member of the tongs.
Figure 6:
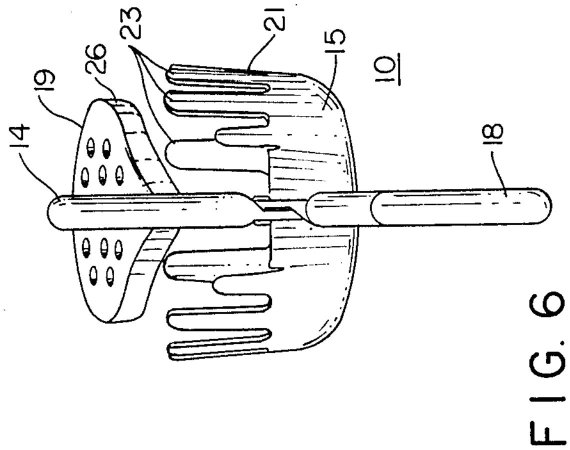
FIG. 6 is a left side elevation view thereof.
Figure 5:
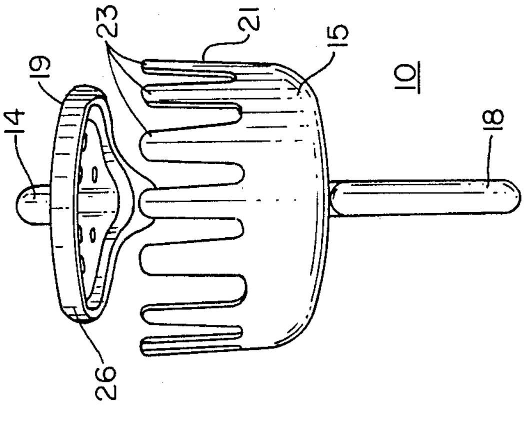
FIG. 5 is a right side elevation view thereof.

The fingers 23 are flexible and resilient, and have rounded ends, and the regions of the ladle bowl between the fingers, i.e., at the bases of the fingers, are rounded. The ladle bowl is preferably generally teardrop-shaped, as best seen in FIGS. 3, 4 and 9.

The spoon 19 has a peripheral lip 26 extending toward the ladle bowl 15 and substantially perpendicular to the bottom surface thereof, as best shown in FIGS. 1 and 2, for helping to retain the contents between the ladle bowl 15 and spoon 19.

The stems 13 and 16 are preferably made of steel (although a strong plastic such as acrylonitrile-butadiene-styrene can alternatively be used), and the handles 14 and 18 are preferably extensions of the stems 13 and 16 respectively, upon which extensions a relatively soft plastic material such as vinyl, polyethylene, nylon or polypropylene, is installed or molded.

The ladle bowl 15 and spoon 19 are preferably made of a relatively heat-resistant thermoplastic material such as polypropylene, and are molded or otherwise fitted on the ends of the stems 13 and 16 respectively.

The length of the fingers 23 is preferably in the range of 0.5 to 1.5 inches, while the spacing between said fingers is preferably in the range of one-eighth of an inch to one-quarter of an inch.

What is claimed is:

1. A pair of tongs for grasping food, comprising:

a first tong member having:

a first stem, a first handle at one end of the first stem, and a ladle bowl at the other end of the first stem, said ladle bowl having a bottom with a plurality of small apertures, an imperforate lower side wall, and an upper side wall structure comprising a plurality of spaced-apart fingers extending upwardly from said lower side wall; and a second tong member having:

a second stem pivotally mounted to said first stem, a second handle at one end of the second stem adjacent said first handle, and a substantially flat holding member at the other end of the second stem, said holding member having a major surface with a plurality of small apertures and being dimensioned to permit it to enter into and substantially cover said ladle bowl below the level of said upper side wall structure to hold the food within the ladle bowl.

2. The tongs according to claim 1, wherein said fingers have rounded ends and the regions of said ladle bowl between said fingers are rounded.

3. The tongs according to claim 1, wherein said ladle bowl is generally teardrop-shaped.

4. The tongs according to claim 1, wherein said holding member has a bottom surface and a peripheral lip extending toward said ladle bowl and substantially perpendicular to said bottom surface.

5. The tongs according to claim 1, wherein said holding member has a longitudinal reinforcing rib extending parallel to said second stem.

* * * * *